United States Patent
Miyamoto

(10) Patent No.: US 7,616,564 B2
(45) Date of Patent: Nov. 10, 2009

(54) CALL ADMISSION CONTROL METHOD AND SYSTEM

(75) Inventor: Rei Miyamoto, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 416 days.

(21) Appl. No.: 11/467,824

(22) Filed: Aug. 28, 2006

(65) Prior Publication Data

US 2006/0285491 A1 Dec. 21, 2006

Related U.S. Application Data

(63) Continuation of application No. 09/615,719, filed on Jul. 13, 2000, now Pat. No. 7,120,114.

(30) Foreign Application Priority Data

Jul. 13, 1999 (JP) .................. 11-199510

(51) Int. Cl.
*H04L 12/26* (2006.01)
(52) U.S. Cl. .................. 370/230; 370/231; 370/232; 370/233; 370/234; 370/235; 370/253; 370/395.41; 370/395.42; 370/395.43; 370/468
(58) Field of Classification Search ......... 370/230–235, 370/253, 395.41, 395.42, 395.43, 468
See application file for complete search history.

(56) References Cited

U.S. PATENT DOCUMENTS

| | | | |
|---|---|---|---|
| 5,289,462 A | | 2/1994 | Ahmadi et al. ............. 370/60.1 |
| 5,347,511 A | | 9/1994 | Gun ............................. 370/54 |
| 5,583,857 A | | 12/1996 | Soumiya et al. ............. 370/233 |
| 5,768,257 A | * | 6/1998 | Khacherian et al. ......... 370/229 |
| 5,982,748 A | | 11/1999 | Yin et al. .................... 370/232 |
| 6,104,698 A | * | 8/2000 | Fan et al. .................... 370/232 |
| 6,282,197 B1 | | 8/2001 | Takahashi et al. ........... 370/395 |
| 6,324,165 B1 | * | 11/2001 | Fan et al. .................... 370/232 |

(Continued)

FOREIGN PATENT DOCUMENTS

EP 673138 A2 9/1995

(Continued)

OTHER PUBLICATIONS

Rei Miyamoto; "Call Admission Control Method and System"; U.S. Appl. No. 09/615,719; filed Jul. 13, 2000; 26 pages.

*Primary Examiner*—William Trost, IV
*Assistant Examiner*—Toan D Nguyen
(74) *Attorney, Agent, or Firm*—Harrity & Harrity, LLP

(57) ABSTRACT

A call admission control technique allowing flexible and reliable call admissions at an ATM switch in the case of an ATM network including both QoS-specified and QoS-unspecified virtual connections is disclosed. In the case where a QoS (Quality of Service) specified connection request occurs, an estimated bandwidth is calculated which is to be assigned to an existing QoS-unspecified traffic on the link associated with the QoS-specified connection request. A call control processor of the ATM switch determines whether the QoS-specified connection request is accepted, depending on whether a requested bandwidth is smaller than an available bandwidth that is obtained by subtracting an assigned bandwidth and the estimated bandwidth from a full bandwidth of the link.

20 Claims, 5 Drawing Sheets

U.S. PATENT DOCUMENTS

| | | | |
|---|---|---|---|
| 6,438,134 B1 | 8/2002 | Chow et al. | 370/412 |
| 6,459,681 B1 | 10/2002 | Oliva | 370/232 |
| 6,532,234 B1 * | 3/2003 | Yoshikawa et al. | 370/395.4 |
| 6,597,662 B1 * | 7/2003 | Kumar et al. | 370/236 |
| 6,606,302 B2 * | 8/2003 | Delattre et al. | 370/230.1 |
| 6,687,254 B1 | 2/2004 | Ho et al. | 370/412 |
| 6,690,671 B1 * | 2/2004 | Anbiah et al. | 370/395.43 |
| 6,762,994 B1 * | 7/2004 | Mitchell et al. | 370/229 |
| 6,771,648 B1 * | 8/2004 | Kim et al. | 370/395.2 |
| 7,215,672 B2 * | 5/2007 | Reshef et al. | 370/395.1 |

FOREIGN PATENT DOCUMENTS

| | | |
|---|---|---|
| JP | 4340830 | 11/1992 |
| JP | 4355535 | 12/1992 |
| JP | 8237246 | 9/1996 |
| JP | 9162875 | 6/1997 |
| JP | 10271116 | 10/1998 |
| JP | 11331166 | 11/1999 |

* cited by examiner

FIG. 2A

CELL TRAFFIC MANAGEMENT TABLE

| INDEX (D31) | LINE NO. (D32) | VPI (D33) | VCI (D34) | AVERAGE RECEPTION TRAFFIC(ART) (D35) | AVERAGE TRANSMISSION TRAFFIC(ATT) (D36) | TYPE OF TRAFFIC (D37) |
|---|---|---|---|---|---|---|
| 1 | | | | | | |
| 2 | | | | | | |
| ⋮ | | | | | | |
| N | | | | | | |

FIG. 2B

CELL ADMISSION MANAGEMENT TABLE

| INDEX (D41) | LINE NO. (D42) | VPI (D43) | VCI (D44) | ASSIGNED BANDWIDTH (D45) | TYPE OF TRAFFIC (D46) |
|---|---|---|---|---|---|
| 1 | | | | | |
| 2 | | | | | |
| ⋮ | | | | | |
| N | | | | | |

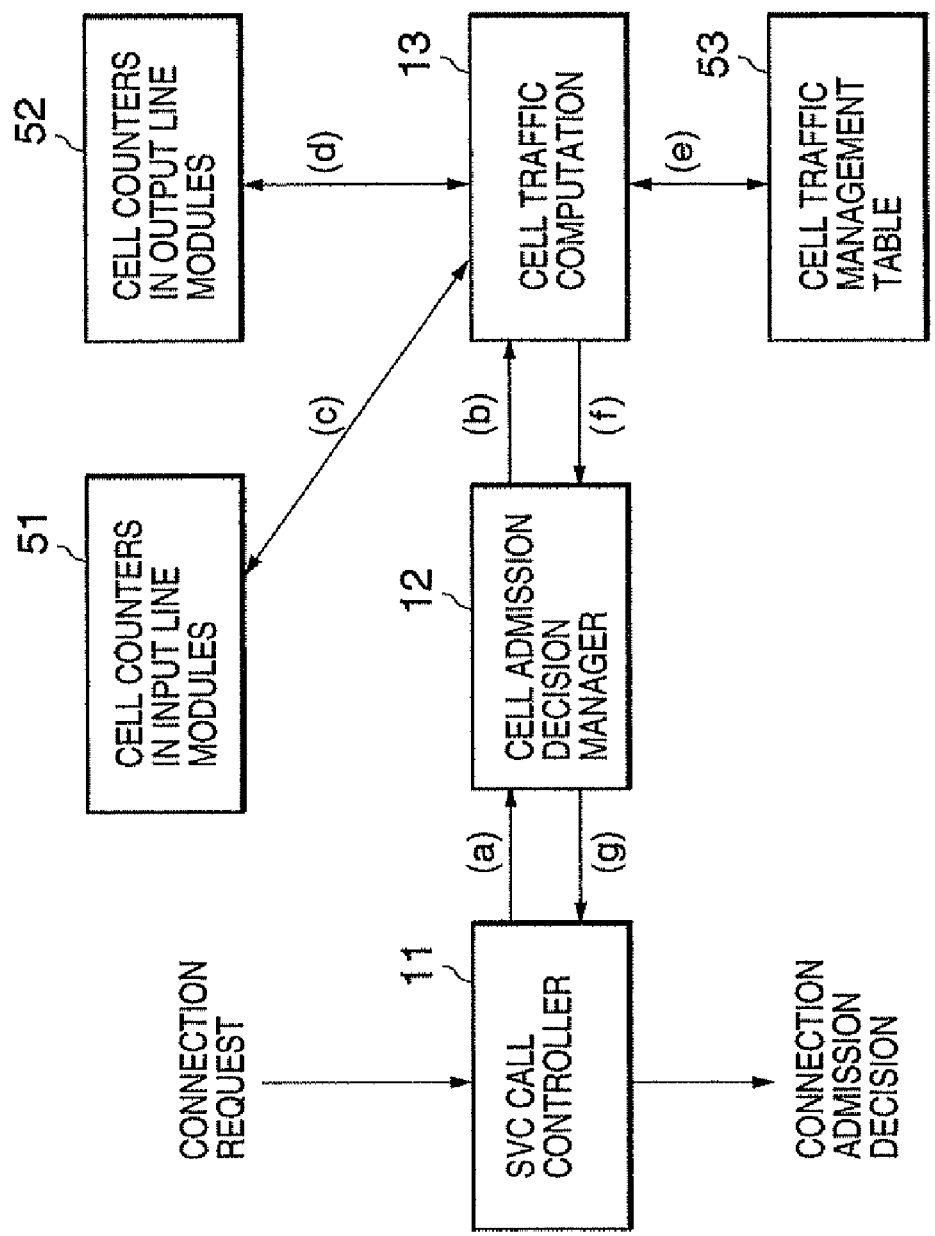

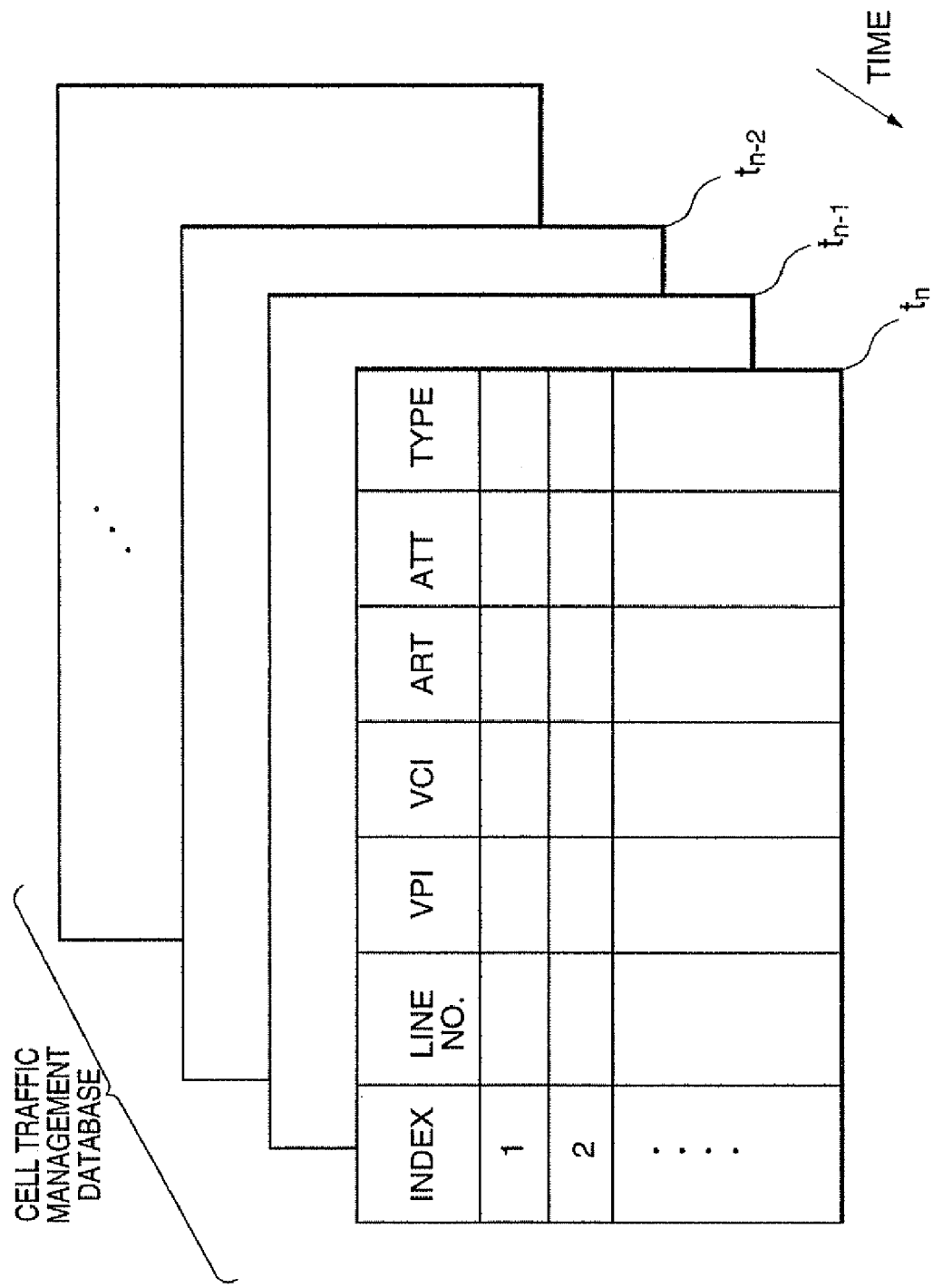

CALL ADMISSION CONTROL METHOD AND SYSTEM

RELATED APPLICATION

This application is a continuation of U.S. Patent Application Ser. No. 09/615,719 filed Jul. 13, 2000 which is incorporated herein by reference.

BACKGROUND OF THE INVENTION

1. Field of the Invention

The present invention relates to call admission control techniques in an ATM (asynchronous transfer mode) switch, and more particularly to call admission control method and system for use in the ATM switch handling QoS (quality of service)-specified and QoS-unspecified virtual connections.

2. Description of the Related Art

In a local-area network (LAN) environment including ATM LANs and legacy LANs, a bandwidth management technique of ATM connections is needed to operate an application requiring a high quality, such as the case of video service.

As an example, a CAC ATM-connection bandwidth management system has been disclosed in Japanese Patent Application Unexamined Publication No. 10-271116. This conventional system is provided with a per-connection bandwidth monitor, allowing CAC (Call Admission Control) information to be calculated and displayed on screen. Further, the conventional system is provided with a simulator for predicting an available connection bandwidth.

Call Admission Control (CAC) is a function of determining whether a connection request is admitted or denied. More specifically, CAC determines whether the connection request can be accepted at SVC (switched virtual connection) call origination time. The connection request can be accepted only if the QoS for all existing virtual connections would still be satisfied if the request was accepted.

However, the conventional CAC has disadvantages in the case where a network using UBR (unspecified bit rate) traffic as normal traffic such as LAN emulation is connected to another network handling QoS-specified virtual connections such as CBR (constant bit rate) or VBR (variable bit rate) virtual connections.

More specifically, as shown in FIG. 4B, it is assumed that the full bandwidth of a line is B, of which a certain portion $A_{QoS}$ is already assigned to CBR/VBR traffic virtual connections and further a portion is assigned to a UBR traffic virtual connection. In this case, if the requested bandwidth R of a CBR traffic virtual connection is smaller than the available bandwidth $A_F=(B-A_{QoS})$, then the connection request is accepted regardless of the UBR traffic virtual connection, which may cause the UBR-traffic virtual connection to be suddenly disconnected.

SUMMARY OF THE INVENTION

It is an object of the present invention to provide a call admission control method and system allowing flexible and reliable call admissions at an ATM switch in the case of an ATM network including both QoS-specified and QoS-unspecified virtual connections.

According to the present invention, a call admission control method includes the steps of: a) receiving a QoS (Quality of Service) specified connection request: b) calculating an assigned bandwidth on a link associated with the QoS-specified connection request; c) calculating an estimated bandwidth to be assigned to an existing QoS-unspecified traffic on the link associated with the QoS-specified connection request; and d) determining whether the QoS-specified connection request is accepted, based on a combination of the assigned bandwidth and the estimated bandwidth.

In the step (c), the estimated bandwidth on the link may be obtained based on an average QoS-unspecified traffic of each QoS-unspecified virtual connection existing on the link associated with the QoS-specified connection request. The average QoS-unspecified traffic may be calculated by adding up existing QoS-unspecified traffics obtained at predetermined sampling time intervals.

The step (c) may include the steps of: adding up existing QoS-unspecified traffics obtained at predetermined sampling time intervals to produce a first average QoS-unspecified traffic; sequentially storing a first average QoS-unspecified traffic each time a corresponding QoS-unspecified connection is established at the ATM switch; and calculating the estimated bandwidth by averaging a predetermined number of first average QoS-unspecified traffics stored.

The step (d) may include the steps of: adding the assigned bandwidth and the estimated bandwidth to produce an currently assigned bandwidth in the link; calculating an available bandwidth of the link by subtracting the currently assigned bandwidth from a full bandwidth of the link; and determining whether the QoS-specified connection request is accepted, depending on a comparison of the available bandwidth and a requested bandwidth of the QoS-specified connection request.

According to anther aspect of the present invention, a call admission control system in an ATM switch having a plurality of links connected thereto, includes: a traffic monitor for monitoring a QoS-unspecified traffic for each QoS-unspecified connection existing on each link; a memory for storing a cell traffic management table containing an average QoS-unspecified traffic for each QoS-unspecified connection existing on each link; and a call admission manager for calculating an estimated bandwidth by adding up average QoS-unspecified traffics for all existing QoS-unspecified connections on a link associated with a QoS-specified connection request, wherein the estimated bandwidth is a bandwidth to be assigned to the existing QoS-unspecified connections on the link, and determining whether the QoS-specified connection request is accepted, based on a combination of the estimated bandwidth and an assigned bandwidth that is already assigned in the link.

According to further another aspect of the present invention, a call admission control system in an ATM switch having a plurality of links connected thereto, includes: a traffic monitor for monitoring a QoS-unspecified traffic for each QoS-unspecified connection existing on each link; a calculator for adding up existing QoS-unspecified traffics obtained at predetermined sampling time intervals to produce a first average QoS-unspecified traffic, and calculating the estimated bandwidth by averaging a predetermined number of first average QoS-unspecified traffics stored; a memory for storing a cell traffic management database sequentially containing a first average QoS-unspecified traffic each time a QoS-unspecified connection is established at the ATM switch; and a call admission manager for calculating an estimated bandwidth by adding up first average QoS-unspecified traffics for all existing QoS-unspecified connections on a link associated with a QoS-specified connection request, wherein the estimated bandwidth is a bandwidth to be assigned to the existing QoS-unspecified connections on the link, and determining whether the QoS-specified connection request is accepted, based on a combination of the estimated bandwidth and an assigned bandwidth that is already assigned in the link.

Since CAC is performed taking into account the bandwidth that is already assigned to the existing QoS-unspecified virtual connection, the UBR-traffic communication is prevented from being suddenly disconnected even in the case of occurrence of a request for a QoS-specified virtual connection requiring a bandwidth greater than the current available bandwidth of a corresponding link.

Since a necessary bandwidth is dynamically assigned to the existing UBR-traffic virtual connection, an available bandwidth at that time can be efficiently assigned to a QoS-specified virtual connection request.

BRIEF DESCRIPTION OF THE DRAWINGS

FIG. 2A is a diagram showing the field structure of a cell traffic management table as shown in FIG. 1;

FIG. 2B is a diagram showing the field structure of a call admission management table employed in the embodiment;

FIG. 3 is a diagram showing an operation of the ATM switch as shown in FIG. 1;

FIG. 5 is a diagram showing a cell traffic management database for use in an ATM switch employing a CAC method according to another embodiment of the present invention.

DESCRIPTION OF THE PREFERRED EMBODIMENTS

Figure 1:
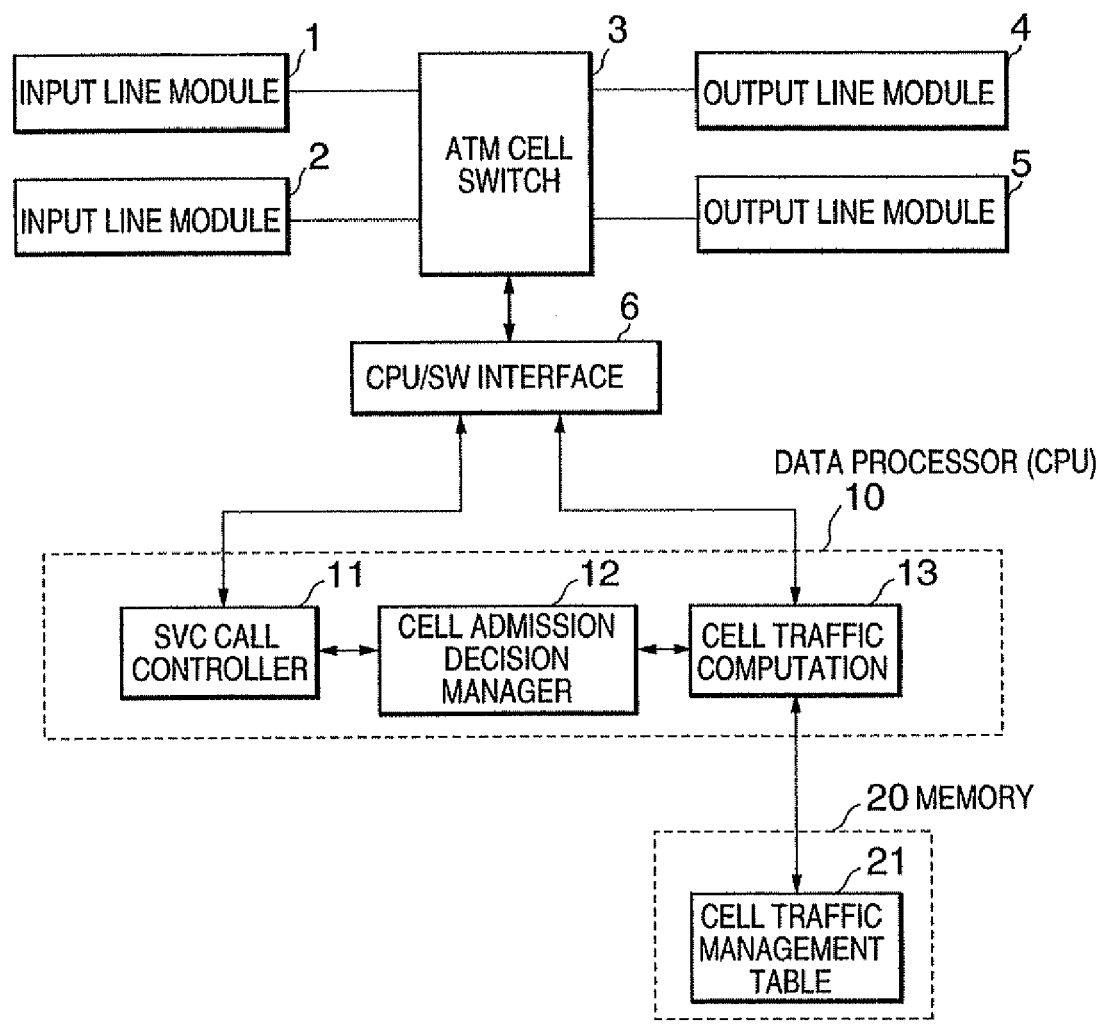
FIG. 1 is a block diagram showing a basic configuration of an ATM switch employing a CAC method according to an embodiment of the present invention.

As shown in FIG. 1, it is assumed for simplicity that an ATM switch has two input ports, two output ports and a control section. The ATM switch according to an embodiment of the present invention is basically structured by input line modules 1 and 2 each connected to the input lines, an ATM cell switch 3, output line modules 4 and 5 each connected to the output lines, CPU/SW interface 6, a data processor (CPU) 10, and a memory 20 storing a cell traffic management table 21.

Each of the input line modules 3 and 2 extracts cells from transmission frames on a corresponding incoming line and counts the number of received cells for each virtual connection. Each of the input line modules 1 and 2 is provided with a counter for counting received cells. At request of the data processor 10, the receiving cell count is output to the data processor 10 through the CPU/SW interface 6 as described later.

The ATM cell switch 3 performs the routing of cells arriving at each input line to the required output line by mapping the VPI/VCI in the header of the incoming cell into the corresponding output VPI/VCI using virtual connection management information that is previously installed in the ATM cell switch 3. In this way, a cell arriving at each input line module is transferred to the required output line module through the ATM cell switch 3.

Each of the output line modules 4 and 5 is provided with a buffering section for transmission queue management and a counter for counting the number of cells transmitted to a corresponding outgoing line for each virtual connection. At request of the data processor 10, the transmitting cell count is output to the data processor 10 through the CPU/SW interface 6 as described later.

The CPU/SW interface 6 is designed to exchange the signaling protocol for SVC call control and cell traffic data between the ATM cell switch 3 and the data processor 10.

The data processor 10 is a program-controlled processor used for control of the ATM switch. The data processor 10 implements the following functions by software processing: SVC call controller 11, call admission decision manager 12, and cell traffic computation section 13.

The SVC call controller 11 processes the signaling protocol for setup and release of a SVC call and extracts parameters of bandwidth and traffic type for each call setup request. The extracted parameters are transferred as information necessary for call setup processing to the call admission decision manager 12. Further, the SVC call controller 11 outputs the results of setup and release of a SVC call to the ATM cell switch 3 through the CPU/SW interface 6. In the ATM cell switch 3, the virtual connection management information is updated depending on the received setup and release results.

The call admission decision manager 12 determines whether a connection request is accepted, depending on the parameters of the connection request and the UBR traffic data received from the cell traffic computation section 13. The details will be described later.

The cell traffic computation section 13 adds up the receiving and transmitting cell counts inputted from the input line modules 1 and 2 and the output line modules 4 and 5 and manages the cell traffic management table 21. The details will be described later.

Table Structure

Referring to FIG. 2A, the cell traffic management table 21 can contain N records and has the following fields: Index D31, Line Number D32, VPI value D33, VCI value D34, Average reception traffic (ART) D35, Average transmission traffic (ATT) D36, and Type of traffic D37. The Line Number D32 indicates an identification number of one of the input line modules and the output line modules. The VPI value D33 and VCI value D34 indicate VPI and VCI in the header of a cell. A combination of the Line number D32, the VPI value D33, and the VCI value D34 identifies a single virtual connection indicated by the Index D31.

The Average reception traffic (ART) D35 indicates the average amount of traffic arriving at the input line module identified by the Line number D32. Similarly, the Average transmission traffic (ATT) D36 indicates the average amount of traffic transmitting from the output line module identified by the Line number D32.

An average traffic may be calculated from the number of cells per second. For example, the cell traffic computation section 13 samples the count value of the counter provided in each of the input and output line modules once per second and then calculates the differential average of 10 sampled counts.

The traffic type D37 indicates the type of the connection identified by the Index S31. Here, the traffic type D37 indicates whether the connection is of UBR traffic. Therefore, the cell traffic computation section 13 can calculate an average reception/transmission traffic of all UBR-traffic virtual connections currently established in a certain input/output line module by adding up N records contained in the cell traffic management table 21.

Referring to FIG. 2B, a call admission management table is also used for conventional CAC operation. The call admission management table can contain N records and has the following fields; Index D41, Line Number D42, VPI value D43, VCI value D44, Assigned bandwidth D45, and Type of traffic D37. The fields D41-D44 and D46 are the same as those of the cell traffic management table 21 as described before. The Assigned bandwidth D45 indicates the bandwidth currently used or occupied by CBR/VBR/UBR-traffic virtual connections. Therefore, by referring to the call admission management table and the cell traffic management table 21, as described hereafter, the call admission decision manager 12 can determine whether a connection request is accepted. It is possible to add the Assigned-bandwidth field D45 to the cell traffic management table 21.

Operation

Referring to FIG. 3, when receiving a QoS-specified connection request for a CBR/VBR-traffic virtual connection, the SVC call controller 11 extracts requested bandwidth and traffic type parameters from the request. The extracted parameters with the respective identification numbers of the input and output line modules involved are output to the call admission decision manager 12 (step (a)).

The call admission decision manager 12 inquires the cell traffic computation section 13 about the bandwidth currently assigned to UBR-traffic virtual connections on the involved input and output line modules (step (b)).

As described before, the cell traffic computation section 13 receives the receiving and transmitting cell counts from cell counters 51 and 52 in the input line module and the output line module involved in a corresponding virtual connection (steps (c) and (d)). Then, the cell traffic computation section 13 uses the receiving and transmitting cell counts to create a record including Average reception/transmission traffic in the cell traffic management table 53. Therefore, in response to the inquiry from the call admission decision manager 12, the cell traffic computation section 13 adds up N records to calculate an average reception/transmission traffic of all UBR-traffic virtual connections currently established in the input and output line modules. The average reception/transmission traffic of the existing UBR-traffic virtual connections is sent back as an estimated UBR traffic to the call admission decision manager 12 (step (f)).

The call admission decision operation will be described with reference to FIG. 4A.

Figure 4A:
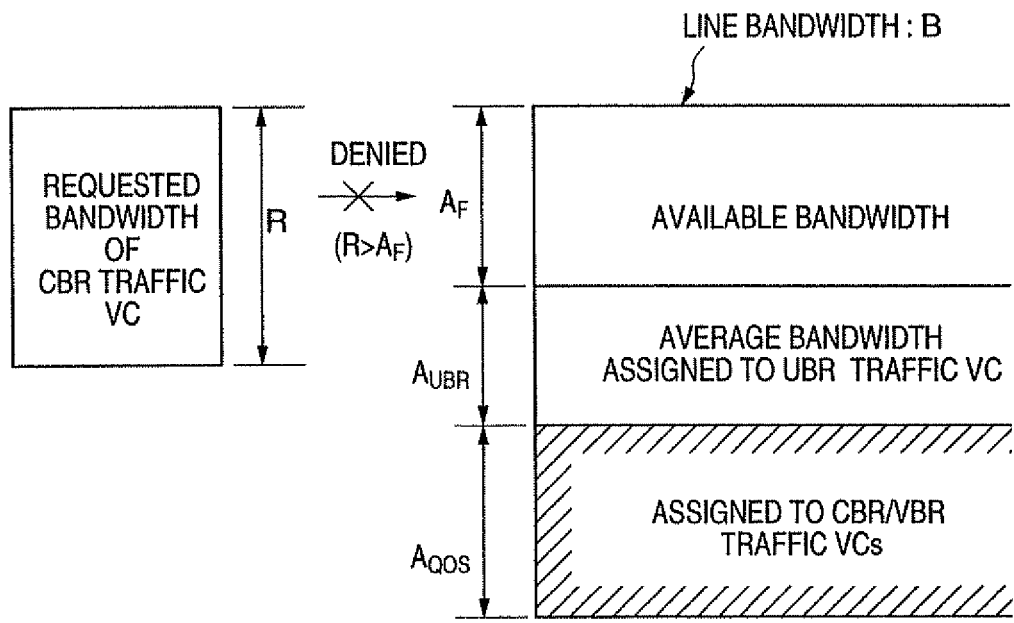
FIG. 4A is a schematic diagram showing a CAC operation according to the embodiment of the present invention.
Figure 4B:
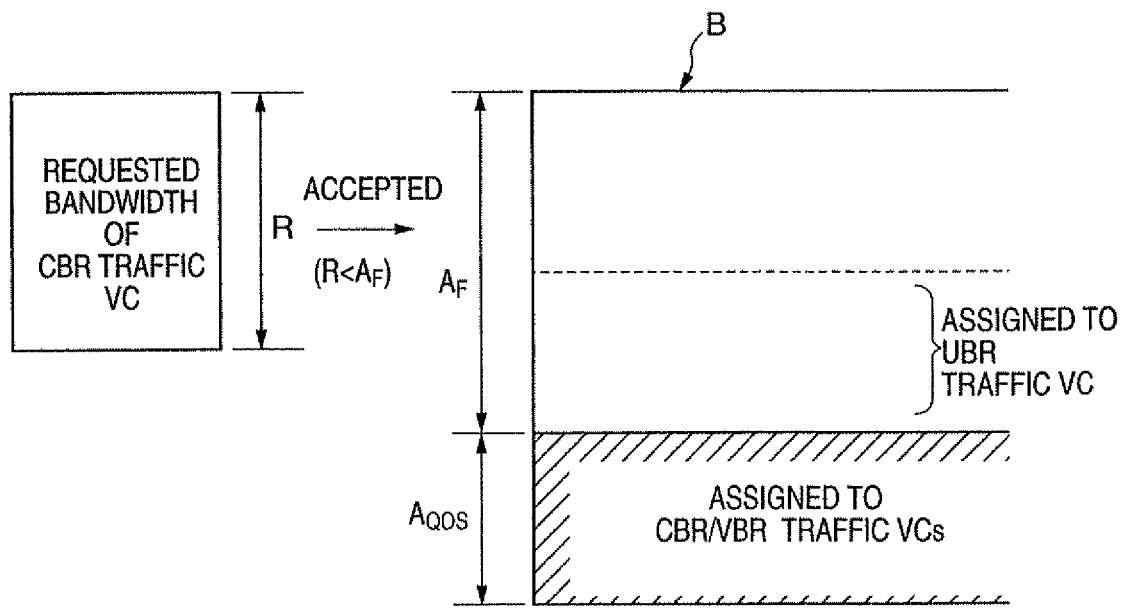
FIG. 4B is a schematic diagram showing a conventional CAC operation.

Referring to FIG. 4A, the call admission decision manager 12 calculates the bandwidth $A_{QOS}$ already assigned to the CBR/VBR-traffic virtual connections by referring to the Assigned bandwidth field D45 of the call admission management table (see FIG. 2B). Further, the call admission decision manager 12 receives the estimated UBR traffic from the cell traffic computation section 13 and calculates an average bandwidth $A_{UBR}$ as an estimated bandwidth to be assigned to the existing UBR-traffic virtual connections. In other words, as shown in FIG. 4A, of the full bandwidth of a line is B, the portion $A_{QOS}$ is already assigned to CBR/VBR traffic virtual connections and the average bandwidth $A_{UBR}$ is assumed to be already assigned to UBR traffic virtual connections.

In this case, if the requested bandwidth R of the CBR traffic virtual connection is smaller than the available bandwidth $A_F=(B-A_{QOS}-A_{UBR})$, then the connection request is accepted because the existing UBR traffic virtual connections are substantially protected. If the requested bandwidth R of the CBR traffic virtual connection is greater than the available bandwidth $A_F=(B-A_{QOS}-A_{UBR})$, then the connection request is denied as shown in FIG. 4A. If the connection request were accepted in this condition, then the existing UBR-traffic virtual connection would be suddenly disconnected or impaired. According to the present embodiment, such a sudden disconnection or impairment of the existing UBR-traffic virtual connection can be avoided. Such a call admission decision result is sent back to the SVC call controller 11 (step (g)).

ANOTHER EMBODIMENT

Another embodiment of the present invention is obtained by replacing the cell traffic management table 21 as shown in FIG. 1 with a cell traffic management database and changing the cell traffic computation program of the cell traffic computation section 13.

As shown in FIG. 5, the cell traffic management database stores a history of cell traffic management table, that is, not only a cell traffic management table at time instant $t_n$ but also past cell traffic management tables at time instants $t_{n-1}$, $t_{n-2}$, .... At each of time instants $t_n$, $t_{n-1}$, $t_{n-2}$, ..., as described before, the cell traffic computation section 13 calculates a first average reception/transmission traffic of all UBR-traffic virtual connections currently established in the input and output line modules.

According to this embodiment, in response to the inquiry from the call admission decision manager 12, the cell traffic computation section 13 calculates an estimated average reception/transmission traffic of all UBR-traffic virtual connections currently established in the input and output line modules by adding up first average reception/transmission traffics obtained over a time period from the current time instant $t_n$ to the predetermined past time instants $t_{n-1}$, $t_{n-2}$, .... Therefore, even in the case of burst-like UBR traffic, a more equitable call admission control can be achieved.

Alternatively, it is possible to sequentially store UBR traffic obtained each time the switching of the ATM switch for UBR traffic is performed. Such UBR traffic data can be used to achieve the similar advantage.

Since the present embodiment can be implemented by only changing the call admission control software of the call admission decision manager 12, the flexible and reliable CAC can be achieved even in the case of LAN emulation environment without changing in hardware. Therefore, a flexible control and an effective utilization of bandwidth in an ATM network become possible.

What is claimed is:

1. A method performed by a device, comprising:
  receiving, by the device, a connection request that specifies a requested amount of bandwidth;
  determining, by the device, an average amount of unspecified bit rate (UBR) traffic;
  determining, by the device, an amount of bandwidth assigned to constant bit rate (CBR) and variable bit rate (VBR) traffic;
  determining, by the device, an amount of available bandwidth based on the average amount of the UBR traffic and the amount of bandwidth assigned to the CBR and VBR traffic; and
  accepting, by the device, the connection request when the requested amount of bandwidth does not exceed the amount of available bandwidth.

2. The method of claim 1, where the connection request specifies the requested amount of bandwidth associated with a particular input line module and output line module pair; and
  where determining the average amount of the UBR traffic includes determining an average amount of the UBR traffic processed by the particular input line module and output line module pair.

3. The method of claim 2, where determining the average amount of the UBR traffic processed by the particular input line module and output line module pair includes:
- determining an average amount of traffic received at the input line module,
- determining an average amount of traffic transmitted by the output line module, and
- determining the average amount of the UBR traffic based on the average amount of traffic received at the input line module and the average amount of traffic transmitted by the output line module.

4. The method of claim 3, where determining the average amount of traffic received at the input line module includes:
- generating a count value of a number of cells received at the input line module,
- sampling the count value at a plurality of sampling points, and
- determining a differential average of the sampled count values as the average amount of traffic received at the input line module.

5. The method of claim 3, where determining the average amount of traffic transmitted by the output line module includes:
- generating a count value of a number of cells transmitted by the output line module,
- sampling the count value at a plurality of sampling points, and
- determining a differential average of the sampled count values as the average amount of traffic transmitted by the output line module.

6. The method of claim 1, further comprising:
- generating a table that includes an average reception traffic value and an average transmission traffic value; and
- where determining the average amount of the UBR traffic includes determining the average amount of the UBR traffic based on the average reception traffic value and the average transmission traffic value.

7. The method of claim 1, further comprising:
- generating a table that includes an average reception traffic value, an average transmission traffic value, and a traffic type value; and
- where determining the average amount of the UBR traffic includes determining the average amount of the UBR traffic based on the average reception traffic value and the average transmission traffic value corresponding to the traffic type value of UBR traffic.

8. The method of claim 1, where determining the average amount of the UBR traffic includes:
- determining a current average amount of the UBR traffic,
- determining at least one prior average amount of the UBR traffic,
- determining the average amount of the UBR traffic based on the current average amount of the UBR traffic and the at least one prior average amount of the UBR traffic.

9. A system, comprising:
- a controller to receive a connection request that specifies a requested amount of bandwidth; and
- an admission decision manager to:
  - determine an average amount of unspecified bit rate (UBR) traffic,
  - determine an amount of bandwidth assigned to constant bit rate (CBR) or variable bit rate (VBR) traffic,
  - determine an amount of available bandwidth based on the average amount of the UBR traffic and the amount of bandwidth assigned to the CBR or VBR traffic, and
  - accept the connection request when the requested amount of bandwidth does not exceed the amount of available bandwidth.

10. The system of claim 9, further comprising:
- a plurality of input line modules;
- a plurality of output line modules, where the connection request specifies the requested amount of bandwidth associated with a particular input line module and output line module pair; and
- a traffic computation section to determine an average amount of the UBR traffic processed by the particular input line module and output line module pair.

11. The system of claim 10, where, when determining the average amount of the UBR traffic processed by the particular input line module and output line module pair, the traffic computation section is configured to:
- determine an average amount of traffic received at an input line module of the particular input line module and output line module pair,
- determine an average amount of traffic transmitted by an output line module of the particular input line module and output line module pair, and
- determine the average amount of the UBR traffic based on the average amount of traffic received at the input line module and the average amount of traffic transmitted by the output line module.

12. The system of claim 11, where, when determining the average amount of traffic received at the input line module, the traffic computation section is configured to:
- generate a count value of a number of cells received at the input line module,
- sample the count value at a plurality of sampling points, and
- determine a differential average of the sampled count values as the average amount of traffic received at the input line module.

13. The system of claim 11, where, when determining the average amount of traffic transmitted by the output line module, the traffic computation section is configured to:
- generate a count value of a number of cells transmitted by the output line module,
- sample the count value at a plurality of sampling points, and
- determine a differential average of the sampled count values as the average amount of traffic transmitted by the output line module.

14. The system of claim 9, further comprising:
- a table that stores an average reception traffic value and an average transmission traffic value; and
- where when determining the average amount of the UBR traffic, the admission decision manager is configured to determine the average amount of the UBR traffic based on the average reception traffic value and the average transmission traffic value.

15. The system of claim 9, further comprising:
- a table that stores an average reception traffic value, an average transmission traffic value, and a traffic type value; and
- where when determining the average amount of the UBR traffic, the admission decision manager is configured to determine the average amount of the UBR traffic based on the average reception traffic value and the average transmission traffic value corresponding to the traffic type value of UBR traffic.

16. The system of claim 9, where when determining the average amount of the UBR traffic, the admission decision manager is configured to:

determine a current average amount of the UBR traffic,
determine at least one prior average amount of the UBR traffic, and
determine the average amount of the UBR traffic based on the current average amount of the UBR traffic and the at least one prior average amount of the UBR traffic.

17. A system, comprising:
means for receiving a connection request that specifies a requested amount of bandwidth for a pair of an input line module and an output line module;
means for determining an average amount of unspecified bit rate (UBR) traffic associated with the input line module and output line module pair;
means for determining an amount of bandwidth assigned to at least one of constant bit rate (CBR) or variable bit rate (VBR) traffic associated with the input line module and output line module pair;
means for determining an amount of available bandwidth associated with the input line module and output line module pair based on the average amount of the UBR traffic and the amount of bandwidth assigned to the at least one of the CBR or VBR traffic; and
means for accepting the connection request when the requested amount of bandwidth does not exceed the amount of available bandwidth.

18. The system of claim 17, where the means for determining the average amount of the UBR traffic includes:
means for determining an average amount of traffic received at the input line module,
means for determining an average amount of traffic transmitted by the output line module, and
means for determining the average amount of the UBR traffic based on the average amount of traffic received at the input line module and the average amount of traffic transmitted by the output line module.

19. The system of claim 18, where the means for determining the average amount of traffic received at the input line module includes:
means for generating a count value of a number of cells received at the input line module,
means for sampling the count value at a plurality of sampling points, and
means for determining a differential average of the sampled count values as the average amount of traffic received at the input line module.

20. The system of claim 18, where the means for determining the average amount of traffic transmitted by the output line module includes:
means for generating a count value of a number of cells transmitted by the output line module,
means for sampling the count value at a plurality of sampling points, and
means for determining a differential average of the sampled count values as the average amount of traffic transmitted by the output line module.

* * * * *